Oct. 16, 1951      R. R. HAYES      2,571,872
ELECTRIC MOTOR FRAME HAVING COOLANT SYSTEM INCORPORATED THEREIN
Filed Nov. 9, 1949      2 SHEETS—SHEET 1
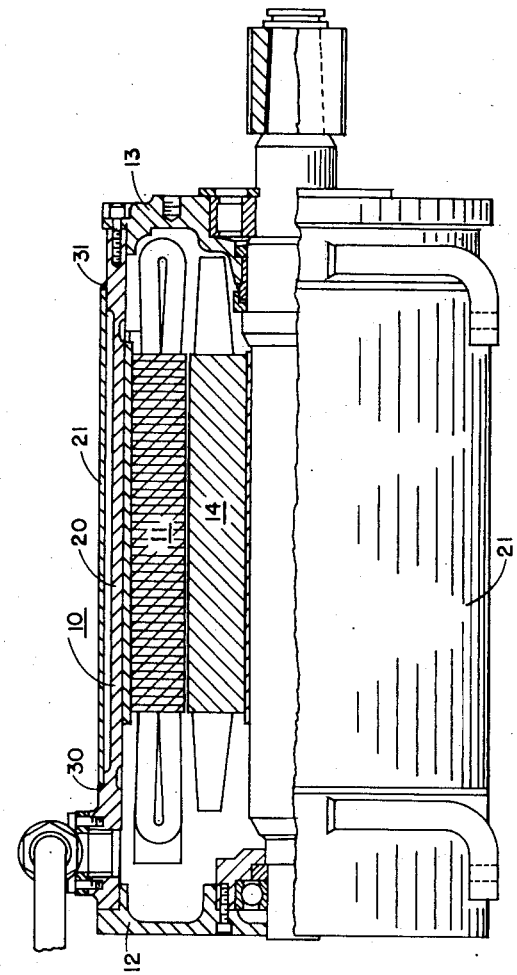
FIG. I
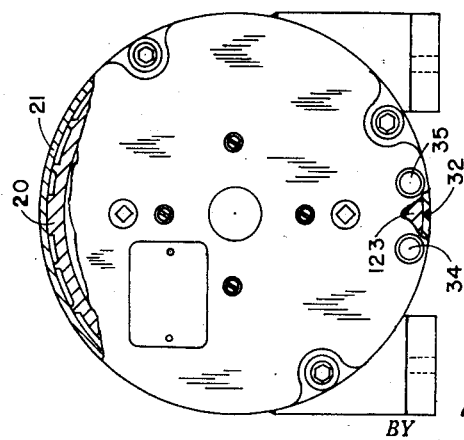
FIG. 2
INVENTOR.
Robert R. Hayes
BY Woodling and Krost
his attnys INVENTOR.
Robert R. Hayes
BY Woodling and Krost
his Attnys Patented Oct. 16, 1951

2,571,872

UNITED STATES PATENT OFFICE 2,571,872

ELECTRIC MOTOR FRAME HAVING COOLANT SYSTEM INCORPORATED THEREIN

Robert R. Hayes, Cleveland, Ohio, assignor to The Reliance Electric & Engineering Co., a corporation of Ohio Application November 9, 1949, Serial No. 126,354

4 Claims. (Cl. 171—252)

1

My invention relates in general to frames for electric motors and more in particular to a frame or housing which has incorporated therein passages for a cooling system for cooling the electric motor.

Many methods have been devised and much experimentation has been done on the cooling of electric motors, and especially electric motors of the explosion proof type. We have devised a housing which can be readily cast with the ribs on the outside thereof and a shell enclosing this housing and engaging these ribs to cause the space between the ribs to serve as cooling passages for the flow of a coolant throughout the housing. This combination of a cast inner frame or housing and a shell plate, which may be welded to the cast inner frame or inner housing, is a simple but effective cooling jacket which covers the marginal portion of the cast housing for either A. C. or D. C. machines. The cast inner frame or housing has channels or ribs molded on its outer periphery in such manner as to form a continuous coolant passage from end to end and covering the outside of the inner frame or housing. Although this construction is particularly suited for cylindrical inner housings or frames, I wish it readily understood that the teachings of my invention can be applied to frames and housings of other shapes without departing from the spirit and scope of my invention.

Keeping in mind the problem involved; that is, providing a cooling system in a cast housing for electric machines so that the rating or power of the machine can be increased without increasing the size of the machine, I have as one of the objects of my invention the provision of a cooling system for an electric motor or other electric machine.

Another object of my invention is to construct a housing for an electric motor from a hollow member having ribs extending lengthwise thereof and on the outside surface thereof with these ribs enclosed by a shell to provide a continuous cooling passage for the flow of a coolant throughout the frame or housing.

Another object of my invention is to provide a cooling system for an electric machine wherein the coolant is in intimate contact with either the magnetic section of a D. C. machine or the inner housing or frame of an A. C. machine which in turn is in contact with the internal parts of the machine to conduct the heat therefrom.

Another object of my invention is to provide a

2 cooling system for explosion proof motors having a cast housing.

A further object of my invention is to provide a cast housing with ribs extending lengthwise thereof and integrally cast therewith by having certain surfaces of the ribs disposed substantially parallel with each other.

A still further object of my invention is to provide a cast housing with ribs extending longitudinally thereof on the outside surface with the surfaces of the ribs aligned whereby the cast housing can be removed from a mold without damaging the mold.

Another object of my invention is to provide a cast cylindrical housing with ribs extending longitudinally thereof on the outside surface with the surfaces of the ribs aligned whereby the cast cylindrical housing can be removed from a mold without damaging the mold.

Other objects and a fuller understanding of my invention may be had by referring to the following description and claims, taken in conjunction with the accompanying drawings in which:

Figure 1 is a side view of a motor frame embodying the features of my invention, with part thereof being shown in section to particularly illustrate the parts thereof;

Figure 2 is an end view of the machine illustrated in Figure 1 with part thereof broken away to particularly illustrate the features of my invention;

Figure 3:
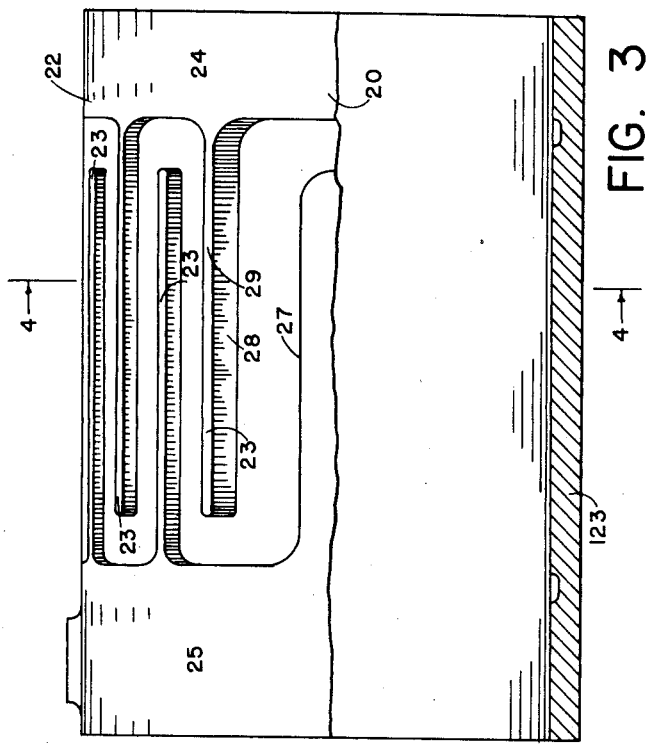
Figure 3 is a slightly enlarged side view of the inner cast housing illustrating the ribs extending longitudinally on the outer surface thereof and with the lower part shown in cross-section.

I have illustrated in Figure 1 the features of my invention as being used in connection with electric motor of the explosion-proof type. However, it is understood that coolant system and the housing described herein can be used in other electrical machinery of A. C. or D. C. design, such as, for example, generators and motors.

The motor illustrated in Figure 1 comprises in general a frame 10 having a stator 11 mounted therein and having end covers 12 and 13 which support a rotor 14. The stator 11 and the rotor 14 may be of any suitable construction as is generally used in electrical machinery.

The frame 10 is constructed from an inner housing 20 and a shell 21 which encloses the housing 20. This inner housing 20 is preferably constructed of casting so that it will provide explosion-proof housing of a unitary integral structure. The general construction of the inner housing 20 which is formed by casting, is best illustrated in Figures 3 and 4.

In this particular instance, the inner housing 20 is of cylindrical construction and has an outer surface 22. A plurality of ribs 23 are integrally cast in the inner housing 20 and extend longitudinally of the housing and along the outer surface 22 thereof. A rib connection portion 24 engages alternate ribs on one end of the housing 20 and a rib connection portion 25 engages the remaining alternate ribs on the other end of the housing.

Figure 3 best illustrates the rib connection portions 24 and 25 integrally engaging the ends of their respective ribs so that a passage is formed extending back and forth between the ribs and around the housing. The ribs 23 and the rib engaging or connecting portions 24 and 25 are raised with respect to the outer surface 22. The ribs 23 join the main body portion of the cast housing 20 throughout a major portion of the length thereof. Each of the ribs 23 is provided with side surfaces 27 and 28, which merge with or intersect the outer surface of the inner housing, 20 and a shell engaging surface 29.

Figure 4:
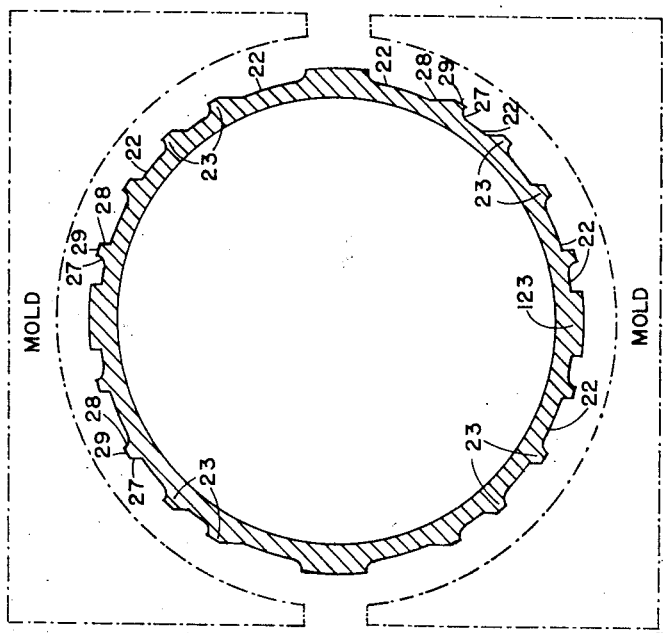
Figure 4 is a sectional view taken along the line 4—4 of Figure 3.

In Figure 4 of the drawings, I have also diagrammatically illustrated the two parts of a mold in which the inner housing 20 may be cast. The side surfaces 27 and 28 along with the shell engaging surface 29 of the ribs are aligned so that the two parts of the mold may be separated and the inner housing 20 removed without damaging the mold. These surfaces can be described as being substantially parallel respectively with each other with the surfaces facing their respective part of the mold, or being disposed in substantially the plane of line of movement of that part of the mold away from the cast inner housing 20.

The side surfaces 27 and 28 of the ribs are curved into the outer surface 22 of the cast housing 20 and the ends of the ribs are curved so that there are no sharp edges or sharp corners on the casting. This curving of the surface provides a much stronger casting as well as preventing the pocketing or eddying of coolant flowing in the space or passage between the ribs.

After the inner housing 20 has been formed as a unitary casting with the ribs and the rib engaging portions, the inner housing is enclosed in the shell 21 as is illustrated in Figure 1. This shell 21 engages the shell engaging surfaces 29 of the ribs 23 as well as engaging the rib connecting portions 24 and 25. I have found it preferable to weld the shell on to the rib connecting portions 24 and 25 as indicated by the weld 30 and 31 in Figure 1. These welds 30 and 31 tightly fasten the ends of the shell onto their respective rib connection portions 24 and 25 to make a sealed coolant enclosure. Thus, the weld 30 may be considered to encircle one end portion of the cast housing 20 and the weld 31 to encircle the other end portion thereof.

In this particular instance, I have used a flat sheet which is pressed around the inner housing 20 for the shell 21. Therefore, I have welded the shell 21 to one of the ribs 23, herein designated as rib 123, for the full length thereof, as is indicated in Figure 2 by a weld 32. This weld 32 extends longitudinally of the shell 21 and thus the inner housing 20. It is understood, however, that although I have used the flat sheet for the shell 21, seamless tubing or other similar members can be used.

The shell 21 cooperates with the ribs 23 and the outer surface 22 to form the coolant passages which extend back and forth longitudinally on the outer surface 22 of the cast housing 20. These passages or spaces between the ribs 23 cover a large part of the surface area of the inner housing 20 so that coolant flowing through the passages will cool the housing 20 and thus the frame 10 of the motor to provide a cooler running motor.

Figure 5:
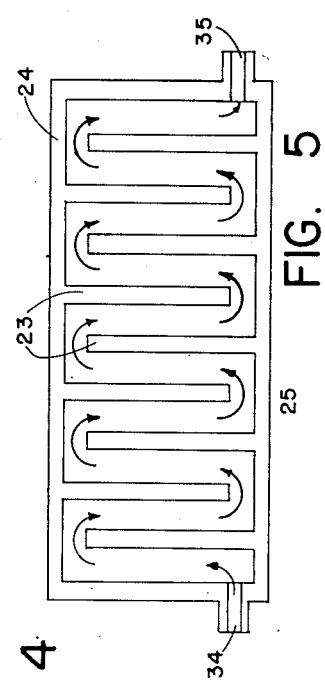
Figure 5 is a diagrammatical illustration of the path of the coolant in the coolant system illustrated in Figures 1, 2, 3 and 4, and which is incorporated in the motor frame or housing.

In Figure 5, I have illustrated a diagrammatical view of the coolant passages showing that the coolant flows back and forth between the ribs 23 and around the inner housing 20. Water enters the fluid passages between the ribs through an inlet and travels in the direction of the arrows until it reaches the outlet. The inlet in this particular instance is provided by a tapped opening 34 in the end of the inner housing 20, as is illustrated in Figure 2. The outlet is similarly shown by tapped opening 35 next adjacent the opening 34 and in the inner housing 20. These tapped openings 34 and 35 are positioned on opposite sides of a common rib and merge with the passageway on the other side of this common rib. This common rib may be joined at both ends thereof to the rib engaging portions.

Any coolant entering the inlet will travel between the ribs in the coolant passages in the general back and forth direction longitudinally of the housing or frame until it reaches the outlet. Any heat generated in the water will travel into the housing 10 and thus be picked up by the coolant. With the system herein described, the coolant flows in coolant passages in the frame constructed from a casting and a shell welded to the casting. An explosion-proof motor having a cast frame with my coolant system therein has a higher rating than other type motors without increasing the size of the motor.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a housing for an electric motor, a unitary hollow cylindrical member formed by casting and having an outer surface, a plurality of raised ribs spaced about said outer surface and extending longitudinally of said cylindrical member, said ribs integrally joining said cylindrical member throughout at least a major portion of the length thereof, each of said ribs having side surfaces curving into said outer surface with the said side surfaces of all the ribs disposed in substantially parallel planes, a raised first end portion integrally joined with the ends of alternate ribs and said cylindrical member on one end thereof and spaced from the ends of the alternate remaining ribs, a raised second end portion integrally joined with the ends of the remaining alternate ribs and said cylindrical member on the other end thereof and spaced from the ends of the ribs joined to the first end portion, said ribs and said end portions being formed on the outer surface of said cylindrical member by casting the same as a single unit.

2. In a housing for an electric motor, a unitary hollow cylindrical member formed by casting and having an outer surface, a plurality of raised ribs spaced about said outer surface and extending longitudinally of said cylindrical member, said ribs integrally joining said cylindrical member throughout at least a major portion of the length thereof, each of said ribs having side surfaces curving into said outer surface with the said side surfaces of all the ribs disposed in substantially parallel planes, a raised first end portion integrally joined with the ends of alternate ribs and said cylindrical member on one end thereof and spaced from the ends of the alternate remaining ribs, a raised second end portion integrally joined with the ends of the remaining alternate ribs and said cylindrical member on the other end thereof and spaced from the ends of the ribs joined to the first end portion, said ribs and said end portions being formed on the outer surface of said cylindrical member by casting the same as a single unit, one of said ribs integrally joining said first end portion and also said second end portion, a coolant inlet on one side of said one of said ribs, a coolant outlet on the other side of said one of said ribs, and a shell engaging said ribs and said end portions thereby providing a continuous coolant passage along the major part of the said outer surface of said hollow member from said coolant inlet to said coolant outlet.

3. In a housing for an electric motor, a unitary hollow cylindrical member formed by casting and having an outer surface, a plurality of raised ribs spaced about said outer surface and extending longitudinally of said cylindrical member, said ribs integrally joining said cylindrical member throughout at least a major portion of the length thereof, each of said ribs having side surfaces curving into said outer surface with the said side surfaces of all the ribs disposed in substantially parallel planes extending parallel to the longitudinal axis of the housing, a raised first end portion integrally joined with the ends of alternate ribs and said cylindrical member on one end thereof and spaced from the ends of the alternate remaining ribs, a raised second end portion integrally joined with the ends of the remaining alternate ribs and said cylindrical member on the other end thereof and spaced from the ends of the ribs joined to the first end portion, said ribs and said end portions being formed on the outer surface of said cylindrical member by casting the same as a single unit.

4. In a housing for an electric motor, a unitary hollow cylindrical member formed by casting and having an outer surface, a plurality of raised ribs spaced about said outer surface and extending longitudinally of said cylindrical member, said ribs integrally joining said cylindrical member throughout at least a major portion of the length thereof, each of said ribs having side surfaces curving into said outer surface with the said side surfaces of all the ribs disposed in substantially parallel planes extending parallel to the longitudinal axis of the housing, a raised first end portion integrally joined with the ends of alternate ribs and said cylindrical member on one end thereof and spaced from the ends of the alternate remaining ribs, a raised second end portion integrally joined with the ends of the remaining alternate ribs and said cylindrical member on the other end thereof and spaced from the ends of the ribs joined to the first end portion, said ribs and said end portions being formed on the outer surface of said cylindrical member by casting the same as a single unit, one of said ribs integrally joining said first end portion and also said second end portion, a coolant inlet on one side of said one of said ribs, a coolant outlet on the other side of said one of said ribs, and a shell engaging said ribs and said end portions thereby providing a continuous coolant passage along the major part of the said outer surface of said hollow member from said coolant inlet to said coolant outlet.

ROBERT R. HAYES.

REFERENCES CITED

The following references are of record in the file of this patent:

UNITED STATES PATENTS

| Number | Name | Date |
|---|---|---|
| 716,278 | Reist | Dec. 16, 1902 |
| 771,468 | Falk | Oct. 4, 1904 |
| 914,046 | Hissink | Mar. 2, 1909 |

OTHER REFERENCES

Pattern Making by Horner, 3rd edition, published 1902 by Crosby, Lockwood and Son, London, pages 164, 165, 166.